United States Patent Office 3,074,850
Patented Jan. 22, 1963

3,074,850
ANALGESIC, ANTIPYRETIC N-METHYL-N'-HALOPHENYL-UREA
Klaus Hasspacher, Biberach an der Riss, Germany, assignor to Dr. Karl Thomae G.m.b.H., Biberach an der Riss, Germany, a corporation of Germany
No Drawing. Filed Apr. 18, 1960, Ser. No. 22,674
9 Claims. (Cl. 167—65)

This invention relates to substituted urea compounds, various methods of preparing such compounds, pharmacologically active compositions containing such compounds and a method of therapeutic application.

More specifically, the present invention relates to compounds having the structural formula

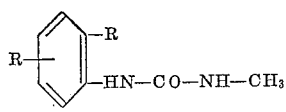
(I)

wherein R is a halogen substituent selected from the group consisting of chlorine and bromine, which may be identical with or different from each other.

The compounds of Formula I may be prepared in a number of ways, namely as follows:

METHOD A (1) By reacting a compound having a structural formula selected from the group consisting of

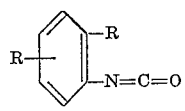
(II)

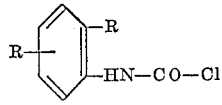
(III)

and

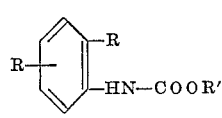
(IV)

wherein R has the meanings defined above and R' is selected from the group consisting of alkyl, aralkyl and aryl, with methylamine ($CH_3$—$NH_2$); or (2) By reacting a compound having a structural formula selected from the group consisting of $$CH_3—N=C=O \quad (V)$$
$$CH_3—HN—CO—Cl \quad (VI)$$

and $$CH_3—HN—COOR' \quad (VII)$$

wherein R' is selected from the group consisting of alkyl, aralkyl and aryl, with a ring-halogenated aniline of the formula

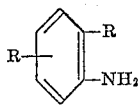
(VIII)

wherein R has the meanings previously defined.

Both variations of this method of preparing the compounds of the present invention are advantageously carried out at a temperature between 0 and 200° C., using equimolar amounts of the reactants or a moderate excess of the methylamine or halo-substituted aniline VIII. Both reactions are preferably carried out in the presence of an inert solvent, such as water, alcohols, benzene, toluene, chloro-benzene, chloroform, carbon tetrachloride, acetone, tetrahydrofuran, dioxane and the like. In those cases where one of the reactants is compound III or compound VI, an excess of at least one mol of methylamine or compound VIII per mol of compound III or VI must be present in the reaction mixture, or at least one mol of an acid-neutralizing compound, such as an inorganic base or an organic tertiary base, must be provided to neutralize in situ the hydrogen chloride split off by the reactions. Typical examples of inorganic bases suitable for this purpose are sodium hydroxide, potassium carbonate, sodium bicarbonate and the like. Examples of suitable inorganic tertiary bases are triethylamine, tributylamine, ethyl-piperidine, pyridine, dimethylamine and the like.

The starting reactants for the two variations of the present method are either well-known compounds or may be readily prepared by procedures which are analogous to known processes. Thus, compounds II and V may be prepared by the method described in Chem. Abstr. 25, 1504/9 or Chem. Abstr. 43, 3378/c; compounds III and VI may be prepared by the process described in J.A.C.S. 47, 410 (1925); and compounds IV and VII may be prepared by the method disclosed in J. Chem. Soc. 109, 98 (1916).

METHOD B

By transformation of the corresponding thiourea compound into the desired urea derivative by oxidation with a suitable oxidizing agent, in accordance with the following reaction equation:

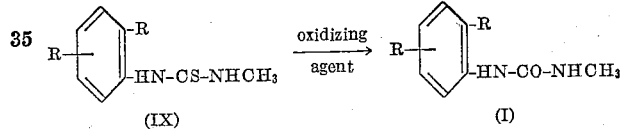

wherein R has the meanings defined above. In this method, one mol of thiourea derivative IX is advantageously reacted at a temperature between 0 and 250° C. with 1–5 mols of an oxidizing agent, such as potassium ferricyanide, ferric chloride, potassium permanganate, potassium chlorate, potassium chlorite, potassium hypochlorite, sodium peroxide, lead oxide, mercuric oxide and the like. The oxidation reaction is advantageously carried out in the presence of an inert solvent, such as water or mixtures of water and organic solvents, such as methanol, ethanol, propanol, tetrahydrofuran, dioxane or acetone.

The thiourea derivatives IX may be prepared from the corresponding halogenated phenyl-isothiocyanates by reaction with methylamine analogous to the procedure described by Wirth in Berichte, vol. 8, page 1524. The phenylisothiocyanates may, in turn, be prepared by the method described in J. Chem. Soc. 1926, page 3042.

METHOD C (1) By reacting a compound having a structural formula selected from the group consisting of

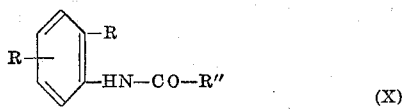
(X)

wherein R has the meanings defined above and R" is selected from the group consisting of amino and acylamino, especially acetylamino, with methylamine; or (2) By reacting a compound having the structural formula

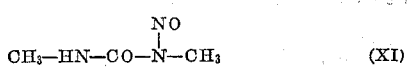
(XI)

with a ring-halogenated aniline of the formula

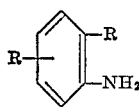

(VIII)

wherein R has the meanings defined above.

Both variations of this method are preferably carried out at a temperature of 0–200° C., using equimolar amounts of the reactants. The reactions may also be performed in the presence of an inert solvent; suitable solvents are those listed in Method A above or a high-boiling-point inert solvent, such as phenol.

A preferred embodiment of the present method comprises passing gaseous methylamine into a solution of the corresponding dihalophenyl-urea in phenol at 150° C.

The starting reactants for the present method are either well-known compounds or may readily be prepared by known processes. For example, compounds X wherein R″ is acylamino may be prepared by the method described in Houben-Weyl, vol. 8, page 128.

METHOD D

By chlorination or bromination of N-methyl-N′-phenyl-urea according to the following reaction equation:

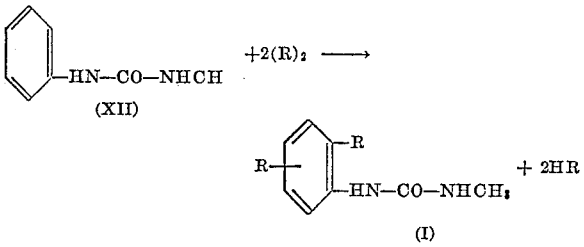

wherein R is a halogen selected from the group consisting of chlorine and bromine.

This reaction is advantageously carried out at a temperature between 0 and 100° C., using 2 mols of bromine or chlorine per mol of N-phenyl-N′-methyl-urea XII. The chlorine or bromine may also be replaced by another suitable halogenating agent, such as N-bromo-succinimide. The reaction may be carried out in the presence of a suitable solvent, such as water, glacial acetic acid, hydrochloric acid and mixtures of these.

Of course, the starting material for the present method may also be a monohalogenated N-phenyl-N′-methyl urea of the formula

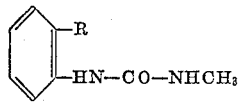

(XIII)

wherein R has the meanings previously defined, which is further halogenated with bromine, chlorine or another halogenating agent under the conditions described above. The mono-halogenated N-methyl-N′-phenyl-urea compounds XIII may readily be prepared by the method described in Berichte, vol. 30, page 650.

The following examples will illustrate the preparation of compounds of the Formula I by the various methods described herein. It will be understood, however, that the invention is not limited to the particular examples given below.

EXAMPLE 1

*N-Methyl-N′-(2,5-Dichlorophenyl)-Urea*

8.1 gm. 2,5-dichloro-aniline were dissolved in 20 cc. benzene and the resulting solution was admixed with 2.85 gm. methyl isocyanate. Thereafter, the mixture was allowed to stand for about two hours, whereupon the reaction product which had crystallized out was separated by vacuum filtration. The product had the structural formula

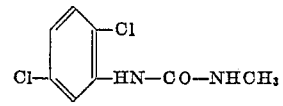

and a melting point of 193° C. The yield was virtually quantitative.

EXAMPLE 2

*N-Methyl-N′-(2,4-Dichlorophenyl)-Urea*

8.1 gm. 2,4-dichloro-aniline were dissolved in 10 cc. dioxane, and the resulting solution was admixed with 2.85 gm. methyl isocyanate. The mixture was then allowed to stand for about two hours, whereupon it was concentrated by evaporation. The reaction product which crystallized out was separated by vacuum filtration and recrystallized from a mixture of ethanol and water. The reaction product had the structural formula

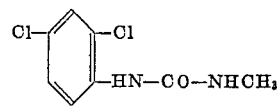

and a melting point of 208° C. The yield was approximately 85% of theory.

EXAMPLE 3

*N-Methyl-N′-(2,3-Dichlorophenyl)-Urea*

3.8 gm. 2,3-dichlorophenyl isocyanate were introduced into 30 cc. of a 35% aqueous methylamine solution. The reaction product which precipitated out was immediately separated by vacuum filtration and recrystallized from ethanol. The product had the structural formula

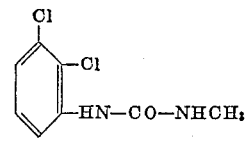

and a melting point of 203° C. The yield was about 90% of theory.

EXAMPLE 4

*N-Methyl-N′-(2,3-Dichlorophenyl)-Urea*

19 gm. of 2,5-dichlorophenyl isocyanate were dissolved in 15 cc. dioxane and the resulting solution was added dropwise to 70 cc. of a 10% aqueous methylamine solution at 15 to 20° C. accompanied by stirring. The reaction product which precipitated out was separated by vacuum filtration, washed with water and dried. The product had the structural formula shown in Example 1 and a melting point of 192° C. The yield was virtually quantitative.

EXAMPLE 5

*N-Methyl-N′-(2,4-Dibromophenyl)-Urea*

4.5 gm. N-methyl-N′-phenyl urea were dissolved in 30 cc. glacial acetic acid and then a solution of 9.6 gm. bromine in 10 cc. glacial acetic acid was added thereto. The reaction mixture was allowed to stand for 30 minutes at 20° C., and at the end of that time it was poured into 400 cc. water. The reaction product which precipitated thereby was separated by vacuum filtration and recrystallized from a mixture of dioxane and ethanol. The product had the structural formula

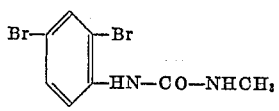

and a melting point of 227° C. The yield was 7.0 gm.

EXAMPLE 6

N-Methyl-N'-(2,5-Dibromophenyl)-Urea 21 gm. 2,5-dibromophenyl isocyanate were dissolved in 50 cc. tetrahydrofuran, and then 300 cc. of a 5% aqueous methylamine solution was added dropwise at 20° C. accompanied by stirring. The precipitate formed thereby was separated by vacuum filtration and recrystallized from a mixture of dioxane and methanol. The product had the structural formula

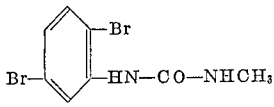

and a melting point of 206° C. The yield was 8 gm.

EXAMPLE 7

N-Methyl-N'-(2,4-Dichlorophenyl)-Urea 3.0 gm. N-methyl-N'-phenyl urea were dissolved in 50 cc. of 50% aqueous acetic acid and the resulting solution was intimately admixed with 1.5 gm. chlorine at 40° C. The precipitate formed thereby was separated by vacuum filtration and recrystallized from a mixture of ethanol and water. The reaction product had the structural formula shown in Example 2 and a melting point of 209° C. The yield was 2.0 gm.

EXAMPLE 8

N-Methyl-N'-(2,5-Dichlorophenyl)-Urea 2.8 gm. dichlorophenyl carbamic acid phenyl ester were dissolved in 40 cc. acetone. The resulting solution was then admixed with 20 cc. of a 35% aqueous methylamine solution, and the mixture was heated for 5 hours at 50° C. The reaction mixture was then diluted with 200 cc. water, and the precipitate formed thereby was separated by vacuum filtration and washed with water. The reaction product had the structural formula shown in Example 1 and a melting point of 194° C. The yield was 2.0 gm.

EXAMPLE 9

N-Methyl-N'-(2,4-Dichlorophenyl)-Urea 4.6 gm. N,N'-dimethyl-N-nitroso-urea and 6.4 gm. 2,4-dichloro-aniline were heated with 60 cc. water on a steam bath until the evolution of gas ceased. The reaction product which was formed thereby was separated by vacuum filtration and recrystallized from a mixture of ethanol and water. The product had the structural formula shown in Example 2 and a melting point of 209° C. The yield was 2.0 gm.

EXAMPLE 10

N-Methyl-N'-(2,5-Dichlorophenyl)-Urea 1.2 gm. N-acetyl-N'-(2,5-dichlorophenyl)-urea were admixed with 15 gm. phenol, the mixture was heated to 150 to 160° C., and then gaseous methylamine was introduced into the melt for 2.3 hours. The phenol was taken up in 2 N sodium hydroxide, leaving the reaction product behind. The product was vacuum filtered and recrystallized from a mixture of methanol and water. The product had the structural formula shown in Example 1 and a melting point of 192 to 193° C. The yield was 0.6 gm.

EXAMPLE 11

N-Methyl-N'-(2,5-Dichlorophenyl)-Urea 5.3 gm. 2,5-dichlorophenyl carbamic acid chloride were dissolved in 20 cc. dioxane and the resulting solution was admixed with 5 cc. of a 35% aqueous methylamine solution. An exothermic reaction developed. After this reaction had subsided, the reaction mixture was allowed to stand for one hour at room temperature. Thereafter, the reaction mixture was diluted with 100 cc. water and the reaction product precipitated thereby was separated by vacuum filtration. The product had the structural formula shown in Example 1 and a melting point of 191° C. The yield was 4.5 gm.

EXAMPLE 12

N-Methyl-N'-(2,4-Dichlorophenyl)-Urea 13 gm. N-methyl-N'-2,4-dichlorophenyl-thiourea, 21 gm. yellow mercuric oxide, 200 cc. dioxane and 20 cc. water were heated together for two hours on a steam bath. At the end of this period the reaction mixture was filtered, the filtrate was diluted with 500 cc. water and the reaction product which precipitated thereby was separated by vacuum filtration and recrystallized from a mixture of methanol and water. The product had the structural formula shown in Example 2 and a melting point of 204° C. The yield was 7.0 gm.

EXAMPLE 13

N-Methyl-N'-(2,5-Dichlorophenyl)-Urea 10 gm. N-2,5-dichlorophenyl carbamic acid methyl ester were dissolved in 50 cc. methanol. The resulting solution was saturated with methylamine and the reaction mixture thus obtained was heated in a closed tube for five hours at 120 to 130° C. After allowing the reaction mass to cool, it was evaporated and the residue was recrystallized from a mixture of methanol and water. The reaction product had the structural formula shown in Example 1 and a melting point of 191° C. The yield was 7.8 gm.

EXAMPLE 14

N-Methyl-N'-(2,4-Dichlorophenyl)-Urea 13 gm. N-methyl-N'-(2,4-dichlorophenyl)-thiourea, 0.5 gm. sulfur, 23 gm. lead oxide and 300 cc. benzene were heated together for two hours under reflux. The reaction mixture was then filtered while it was still hot. The reaction product crystallized out of the filtrate upon cooling. It was separated by vacuum filtration. The product had the structural formula shown in Example 2 and a melting point of 204° C. The yield was 9.3 gm.

EXAMPLE 15

N-Methyl-N'-(2,5-Dichlorophenyl)-Urea 2.0 gm. 2,5-dichlorophenyl-urea were dissolved in 15 gm. phenol. Thereafter, gaseous methylamine was passed through the solution for one hour at 150 to 170° C. The reaction mixture was allowed to cool and was taken up in 100 cc. 2 N sodium hydroxide and the residue was filtered off and recrystallized from methanol. The reaction product had the structural formula shown in Example 1 and a melting point of 191° C. The yield was 0.3 gm.

EXAMPLE 16

N-Methyl-N'-(2-Chloro-4-Bromo-Phenyl)-Urea 10 gm. N-methyl-N'-2-chlorophenyl urea and 10 gm. N-bromo-succinimide were dissolved in 200 cc. chloroform and the resulting solution was refluxed for 5 hours. Thereafter, the reaction mixture was evaporated to dryness and the residue was crystallized from a mixture of methanol and water. The product had the structural formula

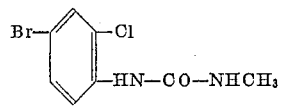

and a melting point of 212° C. The yield was 6.0 gm.

EXAMPLE 17

N-Methyl-N'-(2-Bromo-4-Chlorophenyl)-Urea 3.2 gm. N-methyl-N'-4-chlorophenyl-urea were suspended in 30 cc. glacial acetic acid, and the resulting suspension was admixed at 20° C. with a solution of 3.2 gm. bromine in 10 cc. glacial acetic acid. After all of the material had gone into solution, the reaction solution was heated for 30 minutes at 80° C. and was then poured into 300 cc. water. A precipitate formed which was separated by vacuum filtration and recrystallized from a mixture of ethanol and water. The product had the structural formula

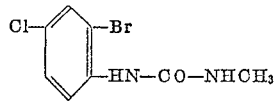

and a melting point of 213° C. The yield was 3.3 gm.

EXAMPLE 18

*N-Methyl-N'-(2-Chloro-4-Bromophenyl)-Urea*

3.6 gm. N-methyl-N'-2-chlorophenyl-urea were dissolved in 30 cc. glacial acetic acid and the resulting solution was admixed at 20° C. with a solution of 3.2 gm. bromine in 10 cc. glacial acetic acid. The reaction mixture was then heated for 30 minutes at 80° C. and then poured into 400 cc. water. The reaction product which precipitated thereby was separated by vacuum filtration and recrystallized from ethanol. The product had the structural formula shown in Example 16 and a melting point of 215° C. The yield was 3.5 gm.

EXAMPLE 19

*N-Methyl-N'-(2,5-Dichlorophenyl)-Urea*

500 gm. 2,5-dichlorophenyl isocyanate, dissolved in 1 liter carbon tetrachloride, were added dropwise to 8 liters of carbon tetrachloride in a 10-liter flask while simultaneously passing gaseous methylamine therethrough. The temperature was maintained between 20 and 30° C. during this entire time. After all of the isocyanate had been added, the precipitate formed thereby was separated by vacuum filtration and washed with carbon tetrachloride. The product had the structural formula shown in Example 1 and a melting point of 196° C. The yield was 525 gm.

The compounds embraced by Formula I above have useful pharmacological properties. More particularly, I have discovered that, when administered to warm-blooded animals in dosage form together with a pharmacologically acceptable carrier, the compounds are powerful antipyretics and analgesics with long duration of effective action and extraordinarily low toxicity. In fact, I have found that in single dosages of 50 to 600 mgm., the compounds according to the present invention are substantially and surprisingly superior to the usual antipyretics and analgesics, such as salicylamide, phenacetin, phenyl-butazone and known urea derivatives of similar structure, with respect to analgesic and antipyretic activity, duration of effective action and low toxicity. Single dosages of 100 to 600 mgm. are preferred, however.

The compounds according to the present invention may be compounded with a variety of pharmacologically acceptable carriers to provide a dosage form which is convenient for pharmacodynamic administration to lower the body temperature and/or reduce the pain threshold. Thus, the compounds may be compounded in the desired weight ratio with the usual carrier materials, such as lactose, soluble starch, glycerin, potato starch, talcum, magnesium stearate and mixtures of these, and the resulting compositions may then be divided and shaped into tablets, coated pills and the like or filled into capsules to provide a convenient dosage form for oral administration. Similarly, the compounds embraced by Formula I may be compounded in the desired weight ratio with the customary suppository bases having a melting point near but below the normal body temperature, such as cocoa butter, to provide a convenient dosage form for rectal administration by means of suppositories.

The following examples will illustrate dosage form compositions. However, it will be understood that the invention is not limited to these particular examples. The parts of the ingredients are parts by weight.

EXAMPLE 20

Tablets:

| | Parts |
|---|---|
| N-methyl-N'-(2,5-dichlorophenyl)-urea | 200.0 |
| Lactose | 100.0 |
| Soluble starch | 16.7 |
| Glycerin | 4.0 |
| Potato starch | 65.0 |
| Talcum | 12.0 |
| Magnesium stearate | 2.3 |

The above ingredients are intimately admixed to form a homogeneous composition, which is then divided and shaped into tablets weighing 400 mgm. each and having a diameter of about 11 mm.

EXAMPLE 21

Coated pills:

| | Parts |
|---|---|
| N-methyl-N'-(2,4-dichlorophenyl)-urea | 200.0 |
| Lactose | 100.0 |
| Soluble starch | 16.7 |
| Glycerin | 4.0 |
| Potato starch | 65.0 |
| Talcum | 12.0 |
| Magnesium stearate | 2.3 |

The above ingredients are intimately admixed to form a homogeneous composition, which is then divided and shaped into tablets weighing 400 mgm. each. The resulting tablets are then coated with a soluble, non-toxic candy or sugar coating.

EXAMPLE 22

Suppositories:

| | Parts |
|---|---|
| N-methyl-N'-(2-bromo-4-chlorophenyl)-urea | 300.0 |
| Cocoa butter | 1510.0 |

The above ingredients are intimately admixed to form a homogeneous mass, which is then melted and poured into cooled suppository molds to form suppositories weighing 1810 mgm. each.

While I have illustrated the present invention with the aid of certain specific embodiments thereof, it will be readily apparent to those skilled in the art that my invention is not limited to those embodiments and that various changes and modifications may be made without departing from the spirit of the invention or the scope of the appended claims.

I claim:

1. An analgesic and antipyretic composition consisting essentially of 50 to 600 mgm. of a compound having the structural formula

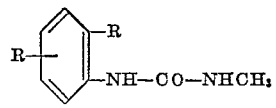

wherein R is a halogen selected from the group consisting of bromine and chlorine, and a pharmacologically acceptable carrier, in dosage unit form.

2. An analgesic and antipyretic composition consisting essentially of 50 to 600 mgm. of N-methyl-N'-(2,5-dichlorophenyl)-urea and a pharmacologically acceptable carrier, in dosage unit form.

3. An analgesic and antipyretic composition consisting essentially of 50 to 600 mgm. of N-methyl-N'-(2,4-dichlorophenyl)-urea, and a pharmacologically acceptable carrier, in dosage unit form.

4. An analgesic and antipyretic composition consisting essentially of 50 to 600 mgm. of N-methyl-N'-(2-bromo-4-chloro-phenyl)-urea, and a pharmacologically acceptable carrier, in dosage unit form.

5. The method of reducing the body temperature and the pain threshold in warm-blooded animals, which comprises administering from 50 to 600 mgm. of a compound having the structural formula

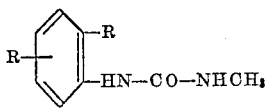

wherein R is a halogen selected from the group consisting of chlorine and bromine, in dosage unit form.

6. The method of reducing the body temperature and the pain threshold in warm-blooded animals, which comprises administering 50 to 600 mgm. of a compound having a structural formula selected from the group consisting of

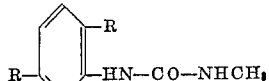

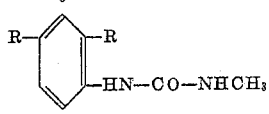

and

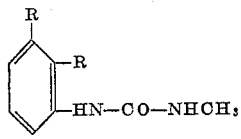

wherein R is a halogen selected from the group consisting of chlorine and bromine, in dosage unit form.

7. The method of reducing the body temperature and the pain threshold in warm-blooded animals, which comprises administering 50 to 600 mgm. of N-methyl-N'-(2,5-dichlorophenyl)-urea, in dosage unit form.

8. The method of reducing the body temperature and the pain threshold in warm-blooded animals, which comprises administering 50 to 600 mgm. of N-methyl-N'-(2,4-dichlorophenyl)-urea, in dosage unit form.

9. The method of reducing the body temperature and the pain threshold in warm-blooded animals, which comprises administering 50 to 600 mgm. of N-methyl-N'-(2-bromo-4-chlorophenyl)-urea, in dosage unit form.

References Cited in the file of this patent
UNITED STATES PATENTS

| | | |
|---|---|---|
| 2,655,447 | Todd | Oct. 13, 1953 |
| 2,673,877 | Thompson | Mar. 30, 1954 |
| 2,768,971 | Jones | Oct. 30, 1956 |
| 2,807,566 | Fellows | Sept. 24, 1957 |